(12) United States Patent
Achard et al.

(10) Patent No.: US 11,525,178 B2
(45) Date of Patent: Dec. 13, 2022

(54) METHOD FOR IMPROVING THE WETTING OF A SURFACE OF A SOLID SUBSTRATE BY A LIQUID METAL

(71) Applicant: CONSTELLIUM ISSOIRE, Issoire (FR)

(72) Inventors: Jean-Louis Achard, Vizille (FR); Fabio Taina, Sassenage (FR)

(73) Assignee: CONSTELLIUM ISSOIRE, Issoire (FR)

( * ) Notice: Subject to any disclaimer, the term of this patent is extended or adjusted under 35 U.S.C. 154(b) by 735 days.

(21) Appl. No.: 16/346,232

(22) PCT Filed: Dec. 6, 2017

(86) PCT No.: PCT/FR2017/053416
§ 371 (c)(1),
(2) Date: Apr. 30, 2019

(87) PCT Pub. No.: WO2018/109319
PCT Pub. Date: Jun. 21, 2018

(65) Prior Publication Data
US 2021/0087666 A1    Mar. 25, 2021

(30) Foreign Application Priority Data
Dec. 12, 2016    (FR) ...................... 1662338

(51) Int. Cl.
*C23C 2/32* (2006.01)
*C04B 41/45* (2006.01)
(Continued)

(52) U.S. Cl.
CPC ............ *C23C 2/32* (2013.01); *C04B 41/4525* (2013.01); *C04B 41/515* (2013.01);
(Continued)

(58) Field of Classification Search
CPC ....................................................... C23C 2/32
See application file for complete search history.

(56) References Cited

U.S. PATENT DOCUMENTS

| 3,733,889 A | 5/1973 | Proctor, Jr. |
| 4,056,434 A | 11/1977 | Barnes et al. |

(Continued)

FOREIGN PATENT DOCUMENTS

| CA | 1230078 A | 12/1987 |
| CN | 1132266 A | 10/1996 |

(Continued)

OTHER PUBLICATIONS

"Basic Application of Ultrasonic Ladle Refining", edited by Kang Shumei et al., Metallurgical Industry Press, 1st edition published in Oct. 2014, pp. 98-101 (non-English).
(Continued)

*Primary Examiner* — Robert A Vetere
(74) *Attorney, Agent, or Firm* — Ladas & Parry LLP; Malcolm J. MacDonald

(57) ABSTRACT

The invention is a method for treating a solid substrate, made from a first material, of metal or ceramic type, the method comprising placing the substrate in contact with a liquid metal, while the substrate is exposed to an ultrasonic wave called a power wave. At the level of a surface of the substrate, the power density is greater than a cavitation threshold of the liquid metal. Such exposure improves the wettability of the substrate surface by the liquid metal.

20 Claims, 7 Drawing Sheets

(51) Int. Cl.
*C04B 41/51* (2006.01)
*C04B 41/88* (2006.01)
(52) U.S. Cl.
CPC ...... *C04B 41/5155* (2013.01); *C04B 41/5161* (2013.01); *C04B 41/5166* (2013.01); *C04B 41/88* (2013.01)

(56) References Cited

U.S. PATENT DOCUMENTS

| | | | | |
|---|---|---|---|---|
| 4,116,766 | A | * | 9/1978 | Poindexter ......... G21C 13/0735 376/310 |
| 6,047,876 | A | * | 4/2000 | Smith ...................... B23K 1/06 228/111.5 |
| 2013/0323178 | A1 | * | 12/2013 | Yamauchi ............ A61K 49/225 424/9.5 |
| 2017/0299555 | A1 | * | 10/2017 | Achard .................. G01N 29/34 |

FOREIGN PATENT DOCUMENTS

| | | |
|---|---|---|
| CN | 1219106 C | 9/2005 |
| JP | H08292179 A | 11/1996 |

OTHER PUBLICATIONS

Chinese Office Action, dated Oct. 27, 2020, corresponding to Chinese Application No. 201780076577.2.
International Search Report, dated Mar. 8, 2018, corresponding to International Application No. PCT/FR2017/053416.

* cited by examiner

METHOD FOR IMPROVING THE WETTING OF A SURFACE OF A SOLID SUBSTRATE BY A LIQUID METAL

TECHNICAL FIELD

The technical field of the invention is the modification of the wetting properties of a surface of a material with regard to a liquid metal, under the effect of exposure to high power ultrasonic waves.

PRIOR ART

In some applications, it is necessary to form a layer of a metal, known as a coating metal, on a substrate. This is the case, for example, with aluminum wires intended to be used as conductors of electricity. The low mass of these wires makes them particularly suitable for automobile or aeronautics applications. Due to the formation of an insulating oxide layer on the surface, the aluminum wires have a high surface resistance, which is detrimental to obtaining quality electrical connections. When the wire is of large section, coating with a layer of nickel has been described in patent FR2796656. The method which is the subject of this patent is operative for wires whose diameter is close to 0.5 cm, but is not satisfactory for smaller diameter wires, for example 0.2 mm, because it is too slow. Chemical and electrochemical surface treatments are being developed to improve the adhesion of a tin or tungsten type coating metal on an aluminum wire.

The inventors have demonstrated that another method can be used to obtain good adhesion of a coating metal, in the liquid phase, on a substrate, for example an aluminum substrate. They have shown that the wettability of the substrate can be increased by a physical process that is simple to use and compatible with industrial applications. They have also found that the increase in wettability can be exploited in other applications, beyond applying a metal coating onto a substrate.

DISCLOSURE OF THE INVENTION

One subject of the invention is a method for treating a solid substrate, comprising the following steps:
a) bringing the solid substrate into contact with a liquid metal, confined inside an enclosure;
b) propagation of an ultrasonic wave, called a power wave, emitted by a power ultrasound generating device in the liquid metal, the ultrasonic power wave propagating though the liquid metal before reaching a surface of the solid substrate, in such a way that at said surface of the solid substrate the power density of the ultrasonic power wave is greater than a cavitation threshold of the liquid metal, the frequency of the ultrasonic power wave being between 10 kHz and 250 kHz;
c) following the propagation of the ultrasonic power wave, obtaining cavitation bubbles in the liquid metal, the cavitation bubbles reaching the surface of the solid substrate, the interaction of the cavitation bubbles with the surface of the solid substrate increasing the wettability of the latter by the liquid metal.

Cavitation threshold means a power density of the ultrasonic power wave beyond which cavitation bubbles are formed in the liquid metal. This may be volume power density or surface power density. Generally, during step b), the surface power density is greater than 1 W/cm², or even 5 or 10 W/cm².

The solid substrate is formed from a first material, whose melting temperature is higher than that of the liquid metal.

According to a preferred embodiment, the frequency of the ultrasonic power wave is greater than 40 kHz, and preferably between 40 kHz and 80 kHz. This makes it possible to increase the wettability of the surface of the solid substrate by the liquid metal without deteriorating the surface condition of the solid substrate.

Advantageously, during step c), the acoustic power wave propagates, inside the enclosure, within the liquid metal, at a propagation distance greater than 1 cm, and preferably greater than 5 cm.

The ultrasonic power wave can in particular propagate from the power generator, and pass through a so-called interface surface extending into contact with the liquid metal, the method comprising the formation of cavitation bubbles inside a cone, called a hyper-cavitation cone, in which the density of the cavitation bubbles is higher than outside the cone, the hyper-cavitation cone extending within the liquid metal from the interface surface, the method being such that in step c) the solid substrate is arranged outside the hyper-cavitation cone. The interface surface may in particular be a solid wall through which the ultrasonic power wave propagates. It may be part of the wall of the enclosure, or a wall defining a waveguide through which the acoustic power wave propagates.

According to one embodiment, the solid substrate may be a metal or ceramic substrate; the method then comprises the following additional steps:
d) exposing the substrate to the ultrasonic power wave for a period of exposure time, preferably between 1 second and 1 minute, the liquid metal forming a layer, known as a coating layer, on the substrate;
e) removing the substrate from the enclosure;
f) after removal, solidification of the liquid metal, so as to form a deposit on the substrate.

According to this embodiment, the substrate may be metallic, the metal comprising the substrate having a melting temperature strictly greater than that of the liquid metal. The liquid metal may be an electrically conductive metal, such that the deposit formed in step f) is an electrically conductive deposit. The liquid metal may in particular comprise tin, zinc or lead. The thickness of the deposit formed during step f) is preferably between 5 μm and 2 mm.

According to one embodiment, the liquid metal comprises aluminum. It may then include magnesium, the mass fraction of magnesium being preferably less than 1%.

According to one embodiment:
an ultrasonic control device propagates an ultrasonic wave, called a control wave, within the liquid metal, through a surface known as a coupling surface, the coupling surface being a surface of the solid substrate extending into contact with the liquid metal;
the solid substrate is delimited by said coupling surface; such that during step c), the wettability of the surface of the solid substrate by the liquid metal is increased so as to improve transmission of the ultrasonic control wave within the liquid metal, through the coupling surface. The power density of the ultrasonic control wave in the liquid metal is generally below the cavitation threshold.

The ultrasonic control device may be placed outside the enclosure, the coupling surface then corresponding to an interface between the enclosure and the liquid metal through which the ultrasonic control wave propagates, the solid substrate being formed by a part of the enclosure delimited by the coupling surface.

The ultrasonic control device may be confined within a containment system, the containment system being immersed in the liquid metal, the coupling surface corresponding to an interface of the containment system with the liquid metal, through which the ultrasonic control wave propagates, the solid substrate being formed by a portion of the containment system delimited by the coupling surface.

According to this embodiment, the chamber may be a nuclear reactor vessel, the liquid metal containing sodium or lead.

Other advantages and features will emerge more clearly from the following description of particular embodiments of the invention, given by way of non-limiting examples, and shown in the figures listed below.

FIGURES

FIG. 1A shows a first embodiment of the invention. FIG. 1B shows a second embodiment of the invention. FIG. 1C shows a detail from FIG. 1A. FIG. 1D shows a detail from FIG. 1B.

FIGS. 2A and 2B show a cross-sectional view of an aluminum alloy wire having been immersed in a bath of liquid tin, without and with the invention being used respectively. FIG. 2C is a detail view of FIG. 2B. FIGS. 2D and 2E show a longitudinal section view of an aluminum alloy wire having been immersed in a bath of liquid tin with the invention being used. FIG. 2E is a detail from FIG. 2D.

FIG. 3A is an observation, using a scanning electron microscope, of a cross-section of an aluminum wire to which a method according to the invention has been applied. FIG. 3B shows a detail from FIG. 3A. FIGS. 3C, 3D, 3E and 3F are X-ray fluorescence spectra corresponding to different analysis points in FIG. 3B.

FIG. 4A is an observation, using a scanning electron microscope, of a longitudinal section of an aluminum wire to which a method according to the invention has been applied. FIG. 4B shows a region of interest in FIG. 4A. FIGS. 4C, 4D, 4E and 4F are X-ray fluorescence spectra corresponding to different analysis points in FIG. 4B.

FIG. 5A is an observation, using a scanning electron microscope, of a cross-section of an aluminum slab to which a method according to the invention has been applied. FIGS. 5B and 5C show two regions of interest in FIG. 5A. FIGS. 5D, 5E and 5F are X-ray fluorescence spectra corresponding to different analysis points in FIG. 5B. FIGS. 5G and 5H are X-ray fluorescence spectra corresponding to different analysis points in FIG. 5C.

DISCLOSURE OF PARTICULAR EMBODIMENTS

The use of ultrasound is common in various industrial applications: at high power, ultrasounds can, for example, be used for cleaning applications. At low power, they are commonly used for non-destructive testing applications in materials or structures.

The invention is based on the advantageous use of power ultrasound to increase surface wettability of a solid substrate by a liquid metal. The inventors found that applying a high power ultrasonic wave to a metal or ceramic substrate immersed in a bath formed by a liquid metal increases the wettability of the surface of the substrate by the liquid metal.

Figure 1A:
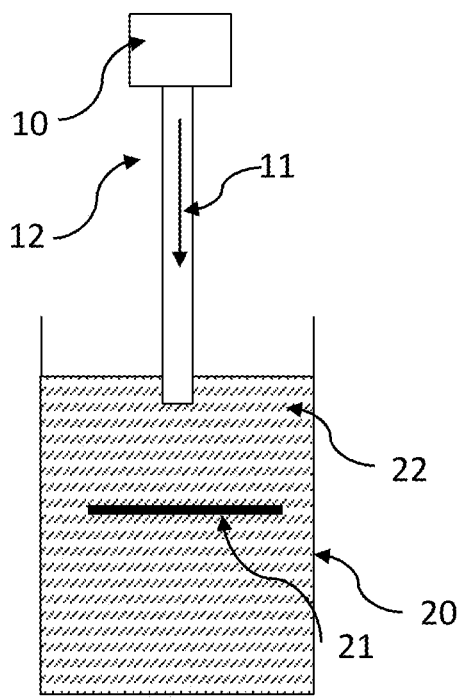

According to a first application, the invention is used to deposit a layer of a metal on a substrate. A first embodiment is shown in FIG. 1A. A solid substrate 21, formed by a first material, for example an aluminum alloy, or by a ceramic, is immersed in a bath of a second metal 22 in liquid state. In this example, the liquid metal is tin. The liquid metal bath is contained in a crucible forming an enclosure 20. In this example, the mass of liquid metal 22 is 5 kg, the bath being heated to a temperature of 350° C. The melting temperature of the liquid metal must be strictly less than the melting temperature of the first material forming the substrate.

An ultrasonic generator device 10, known as a power generator (or ultrasonic motor), is placed near the enclosure 20, a waveguide 12 extending between the ultrasound generator 10 and the liquid metal bath 22. The waveguide 12 dips into the liquid metal 22, and allows an ultrasonic wave 11 emitted by the ultrasound generator 10 to propagate within the liquid metal 22. The ultrasonic generator 10 is for example a piezoelectric transducer that can be deformed when subjected to an alternating electric polarization, the deformation causing the ultrasonic acoustic wave 11. The ultrasonic wave 11 propagates inside the waveguide 12. The waveguide may be formed by a metal, for example based on titanium, or by a rigid ceramic.

The ultrasonic wave 11 emitted by the generator 10 is a high power wave. High power means between 10 W and 200 W or more, so that the power density at the substrate 21 is greater than a cavitation threshold of the liquid metal 22. The cavitation threshold may be expressed according to a surface power density, in which case it is greater than 1 W/cm$^2$, or even 5 W/cm$^2$, or even greater than 10 W/cm$^2$, depending on the liquid metal 22 and the temperature. Also, preferably, the power of the ultrasonic wave 11 is adjusted so as to obtain a surface power density, over all or part of the surface of the solid substrate, greater than the cavitation threshold of the liquid metal 22.

The appearance of a cavitation in a liquid medium gives rise to acoustic waves, detection of which makes it possible to detect the occurrence of said cavitation. The cavitation threshold, in a liquid metal, can be determined experimentally by methods based on the detection of such acoustic waves. Examples are given in documents FR2404850 and EP0221796. An optical cavitation detection method is also described in WO2006034040.

The inventors found that the formation and propagation of cavitation bubbles at the interface between the substrate 21 and the liquid metal 22 are capable of improving the wettability of the substrate 21 by the liquid metal 22. This effect is attributed to the interaction of the cavitation bubbles in contact with the surface of the substrate 21, or in the vicinity of the latter, and in particular the implosion of the cavitation bubbles. This causes a decrease in surface tension at the interface between the substrate 21 and the liquid metal 22. This increases the wettability of the surface of the substrate 21 by the liquid metal 22. It has also been observed that when the substrate has an oxide layer, the cavitation formed at the interface of the substrate and the liquid metal makes it possible to reduce or eliminate the oxide layer, which facilitates direct connection between the substrate 21 and the liquid metal 22. When the frequency of the ultrasonic power wave 11 decreases, the impact of the cavitation bubbles on the substrate forms cavities 27 on the surface of the substrate, under the effect of local dissolution of the substrate. The cavities 27 may be a few dozen microns deep or even be a few hundred microns from the surface of the substrate. The formation of these cavities can deteriorate the surface condition of the substrate.

As a consequence of the increase in the wettability of the surface of the substrate 21 by the liquid metal 22, a layer 25 of liquid metal, called the coating layer, is formed on the substrate. When removing the substrate 21 from the liquid metal bath, the coating layer 25 remains around the substrate 21. It cools down and solidifies, forming a durable solid deposit over time.

The frequency of the ultrasonic wave, known as the power wave, is preferably between 10 kHz and 250 kHz, and preferably between 10 and 100 kHz. It is considered that the higher the frequency, the lower the effect of cavitation bubbles on the substrate surface, reducing the formation of cavities 27. This is because when the frequency increases, the size of the cavitation bubbles decreases. Preferably, the frequency of the ultrasonic power wave 11 is adjusted so as to limit or even prevent the appearance of such cavities, so as to preserve the surface condition of the substrate.

It is therefore advantageous that the frequency of the ultrasonic wave 11 should be greater than 20 kHz, and preferably greater than 40 kHz. The range 40 kHz-80 kHz is considered optimal, so that the effect of the cavitation bubbles on the substrate 21 is superficial, without forming cavities.

As shown in FIGS. 1A to 1D, the ultrasonic wave 11 emitted by the generator 10 propagates towards the enclosure 20 passing through a surface 13, called an interface surface, extending into contact with the liquid metal 22, through which the ultrasonic wave 11 propagates to reach the liquid metal 22. In the example shown in FIGS. 1A and 1C, the ultrasonic wave 11 is propagated to the liquid metal 22 by a waveguide 12, a proximal end of which is placed in contact with the generator, and a distal end of which dips into the liquid metal 22. In this case, the interface surface 13 corresponds to the distal end of the waveguide 12 extending orthogonally to the direction of propagation of the ultrasonic wave 11. In the example shown in FIGS. 1B and 1D, the interface surface 13 is the wall of the enclosure 20, extending in contact with the liquid metal, and placed between the power generator 10 and the liquid metal. In general, the interface surface 13 is a surface in contact with the liquid metal 22, and through which the ultrasonic power wave 11 propagates. It may be a solid wall, in this case a wall of the waveguide or a wall of the enclosure. When the power of the ultrasonic wave 11 is too high, the cavitation bubbles may be organized in the vicinity of the interface surface 13 forming a conical volume 15, whose base is refined as a function of the distance relative to the interface surface. The formation of such cavitation bubbles inside a cone is, for example, described in the publication Dubus "Génération d'ondes de chocs et focalisation à courte distance dans le champ de cavitation ultrasonore à basse fréquence" (Generation of shock waves and short-range focusing in the field of low frequency ultrasonic cavitation), 10th French acoustics conference, Lyon, Apr. 12-16, 2010. Inside such a cone, called a hyper-cavitation cone, the volume density of the cavitation bubbles is higher than in the rest of the enclosure, outside the cone. These cavitation bubbles are essentially due to cavitation nuclei present at the interface surface 13.

It is preferable to avoid excessive exposure of the substrate 21 to the high density of cavitation bubbles within the hyper-cavitation cone 15, since this may lead to a deterioration of the surface condition of the substrate. For this reason, the substrate 21 is preferably placed at a sufficient distance from the interface surface 13, and outside the hyper-cavitation cone 15 if there is one. The ultrasonic power wave 11 therefore propagates within the liquid metal 22, at a propagation distance greater than 1 cm, or even 5 cm, before reaching the substrate 21. This makes it possible to prevent the substrate 21 from interacting with the cavitation bubbles formed in the vicinity of the interface surface 13 or in the hyper-cavitation cone 15.

Figure 1B:
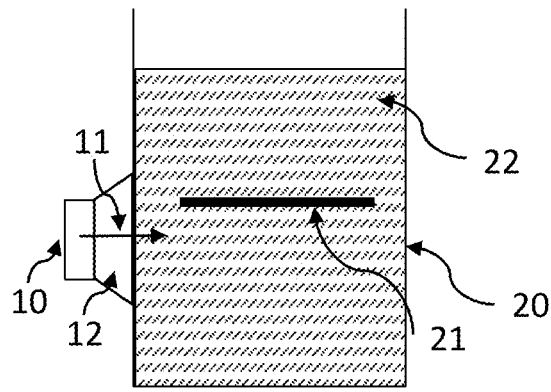
Figure 1C:
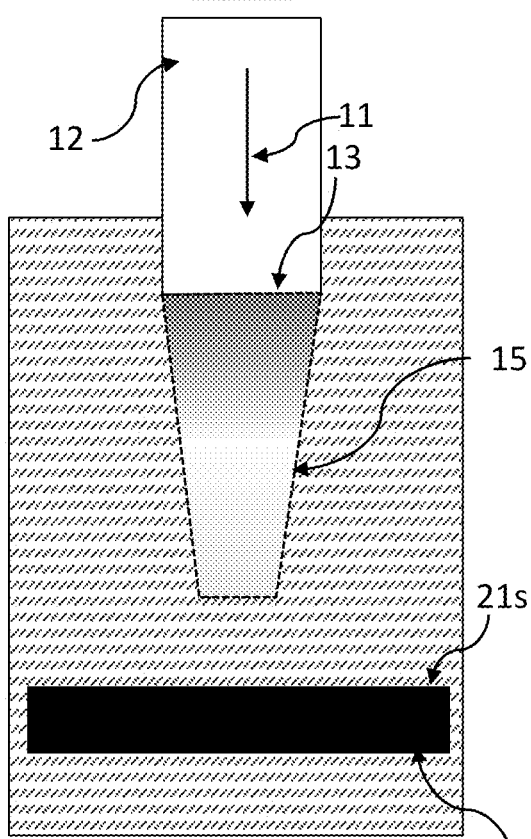
Figure 1D:
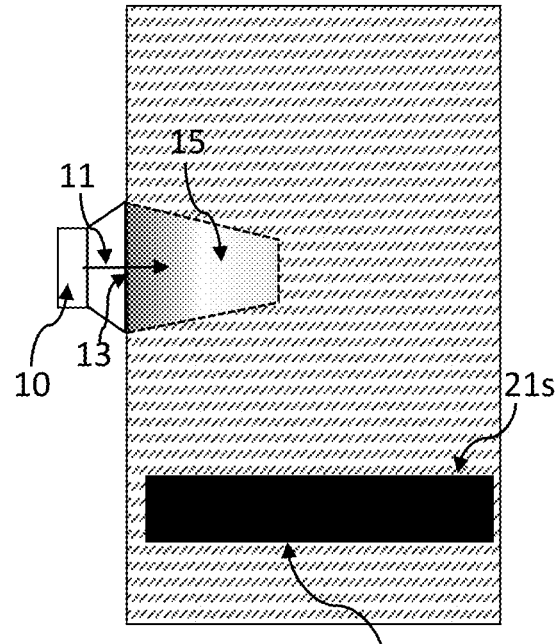

FIGS. 1B and 1D show an embodiment according to which the power ultrasound generating device 10 is coupled to a waveguide 12, the latter extending between the ultrasound generator 10 and the enclosure 20. In this way the waveguide is not immersed in the liquid metal 22, but transmits the ultrasonic wave 11 through a wall of the enclosure 20. According to one variant, the ultrasound generator 10 can be placed directly against the enclosure 20, without a waveguide 12 extending between the generator and the enclosure. In such a configuration, the interface surface 13 corresponds to a wall of the enclosure 20 in contact with the liquid metal 22, through which the ultrasonic power wave 11 propagates. FIG. 1D shows the formation of a hyper-cavitation cone 15 extending into the liquid metal 22 from the interface surface 13.

Whatever the embodiment, the duration of exposure of the substrate 21 to the ultrasonic wave 11 is between 1 second and a few minutes. It is preferably between 1 second and 30 seconds.

Experimental Tests

Figure 2A:
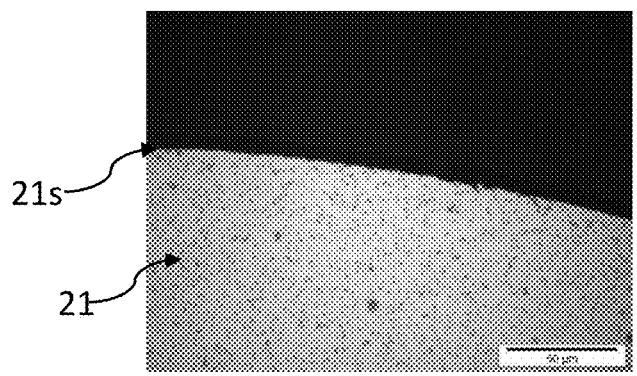

The device shown in FIG. 1A has been used to perform experimental tests. The substrate used was first of all a 5XXX type aluminum alloy wire of diameter between 1.5 and 2 mm. The liquid metal 22 consisted of tin heated to a temperature of 350° C. The substrate was immersed in the enclosure 20 for a period of between 5 and 10 seconds. Substrate 21 did not undergo any pretreatment such as cleaning, degreasing or pickling before being immersed in enclosure 20. The surface of the wire contained a thin layer of alumina (aluminum oxide). During the first control test, the substrate was immersed in the enclosure and then removed, without having been exposed to an ultrasonic wave. FIG. 2A shows a section of the wire in the transverse direction, i.e. a cross-section. The tin does not wet the substrate and when the substrate is removed from the enclosure, no tin deposit remains at the surface of the substrate. A second test was then carried out, during which a 5XXX alloy aluminum wire of diameter 1.5 mm was immersed in a bath of liquid tin. The experimental parameters are as follows:

waveguide: Titanium TA6V—length 375 mm—diameter 30 mm;

frequency of the ultrasonic wave: 20 kHz distance between the waveguide and the substrate: 10 cm After being exposed to the ultrasonic wave 11, the substrate 21 was removed from the liquid metal and then cooled.

Figure 2B:
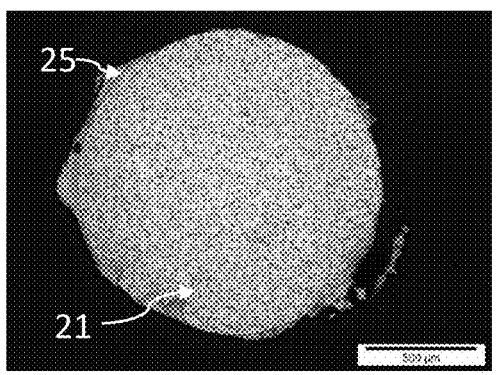
Figure 2C:
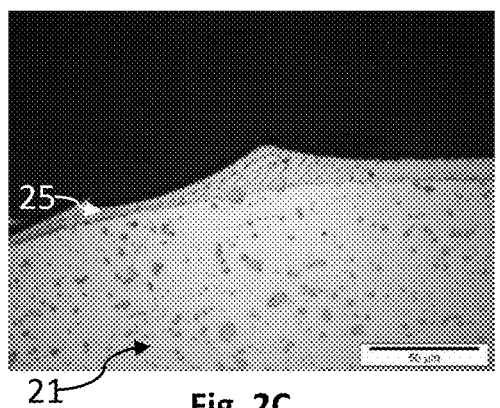

FIG. 2B shows an optical microscope observation of a section of the substrate in the transverse direction. A layer of tin 25 forming a deposit around the substrate 21 can be distinguished. FIG. 2C shows a detail from FIG. 2B. It shows that the tin layer 25 extends around the substrate 21, with a thickness of between 5 and 30 μm.

Figure 2D:
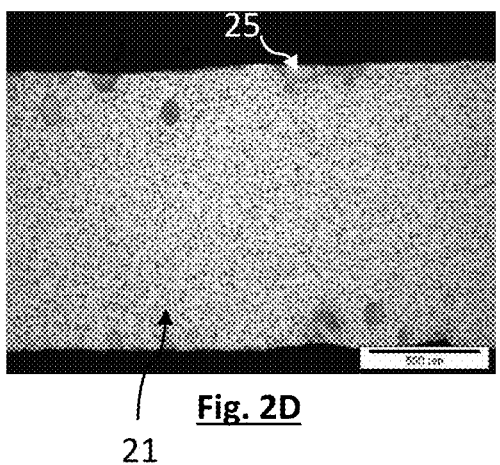
Figure 2E:
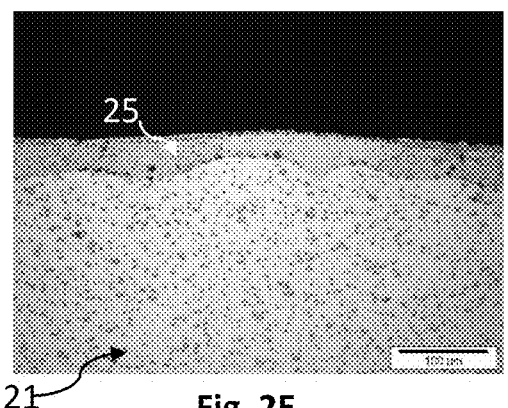

FIG. 2D shows a section of the substrate 21 along the longitudinal direction (or longitudinal section). FIG. 2E shows a detail from FIG. 2D. It shows that the tin layer 25 extends along the entire length of the field of observation, with a thickness of between 5 and 30 μm. In a third test, the substrate used was an aluminum slab 2.5 mm thick. The formation of a tin layer on the aluminum slab was also observed, the thickness of the tin layer being between 10 and 50 μm.

Figure 3A:
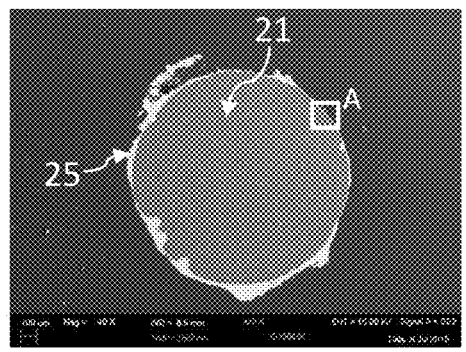
Figure 3B:
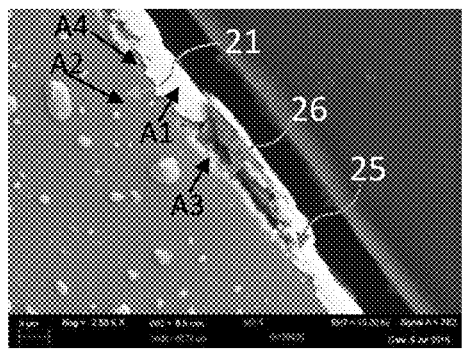
Figure 3C:
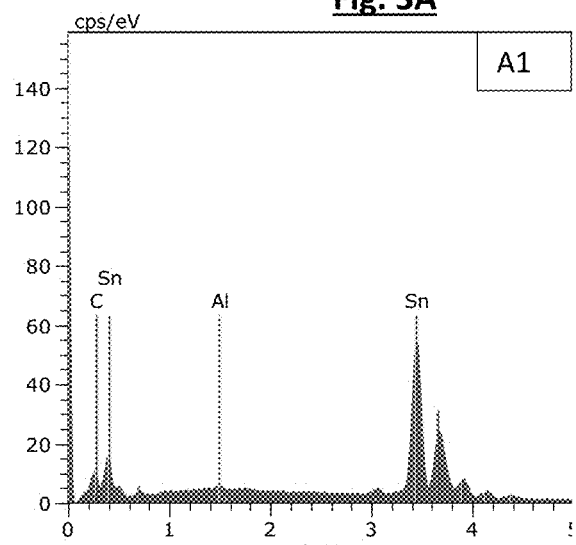
Figure 3D:
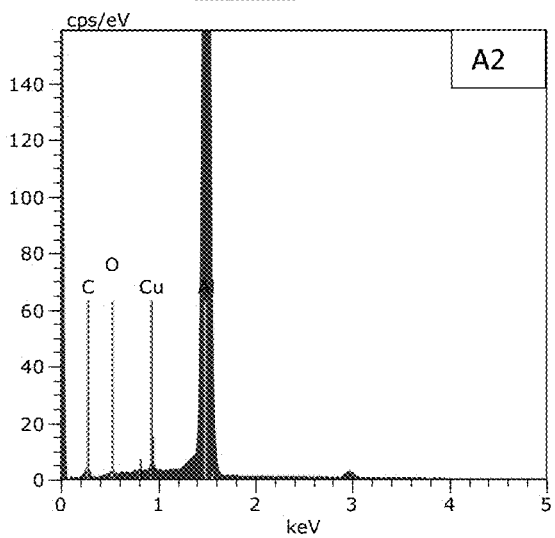
Figure 3E:
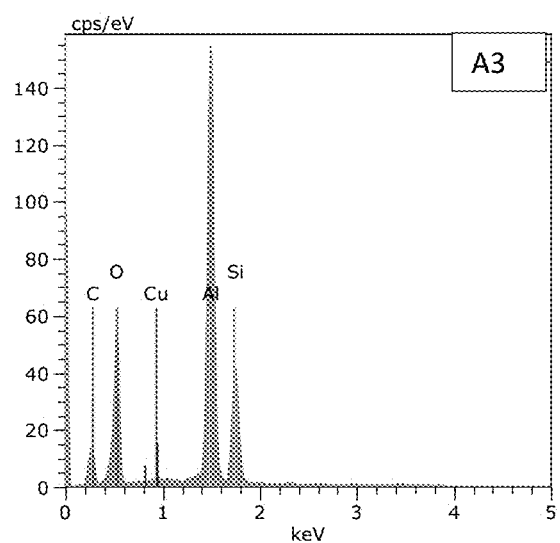
Figure 3F:
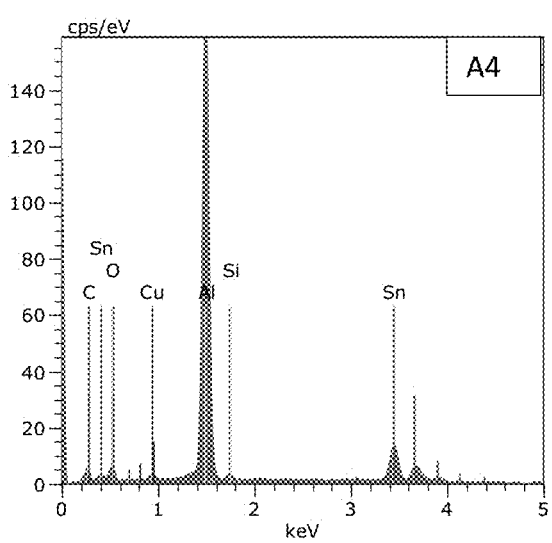

FIG. 3A shows a scanning electron microscope observation using a field-effect X-ray source, a cross-sectional view, in the transverse direction, of a 1 mm diameter 1XXX aluminum alloy wire. The wire was immersed in a bath of liquid tin heated to 260° C. and exposed to an ultrasonic wave 11 at a frequency of 20 kHz, according to the embodiment shown in FIG. 1A. The wave power was 100 W. A layer of tin 25 deposited around the substrate 21 can be observed. In FIG. 3A, a region of interest A has been marked, this being the subject of FIG. 3B. In this region of interest, four analysis points were identified, on which an X-ray fluorescence spectrometric analysis was performed. FIGS. 3C, 3D, 3E and 3F are spectra corresponding to analysis points A1, A2, A3 and A4 respectively plotted in FIG. 3B. On each spectrum, the energies corresponding to elements sought are identified by vertical bars. FIG. 3C corresponds to the tin coating layer 25 and confirms that this layer is formed by the liquid metal, in this case tin. FIG. 3D corresponds to point A2, located deep in the substrate 21. A spectrum representative of the aluminum alloy is obtained. FIG. 3E corresponds to point A3, and reveals the presence of aluminum oxide. It can be seen that at point A3, the coating layer 25 does not seem to directly wet the substrate 21, but a residual oxide layer 26. FIG. 3F corresponds to point A4, situated at the interface between the substrate 21 and the coating layer 25. The spectrum reflects a predominant aluminum content, with a trace of tin. At this point, then, the oxide layer has been removed, the liquid metal 22 directly wetting the substrate 21. Cavitation seems to have the effect of progressively reducing or eliminating the oxide layer 26 extending around the substrate. When it removes it (point A4), adhesion of the coating layer 25 directly to the substrate 21 is obtained. When it cannot completely eliminate it (point A3), an oxide layer 26 remains between the coating layer 25 and the substrate 21, and there is no electrical continuity between the substrate 21 and the coating layer 25. This electrical continuity is particularly sought, for example, in the case of a deposit for electrical connection application. For this type of application, it is therefore sought to remove the oxide layer.

Figure 4A:
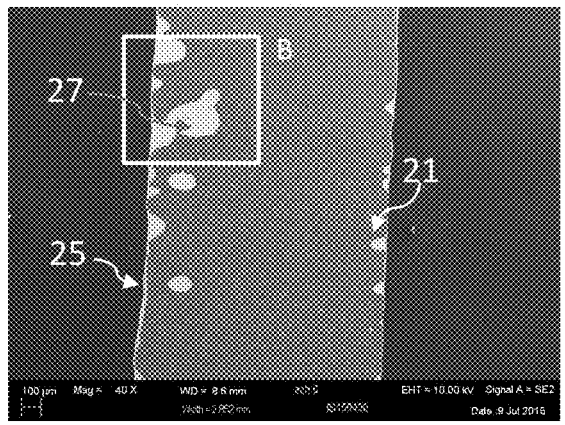
Figure 4B:
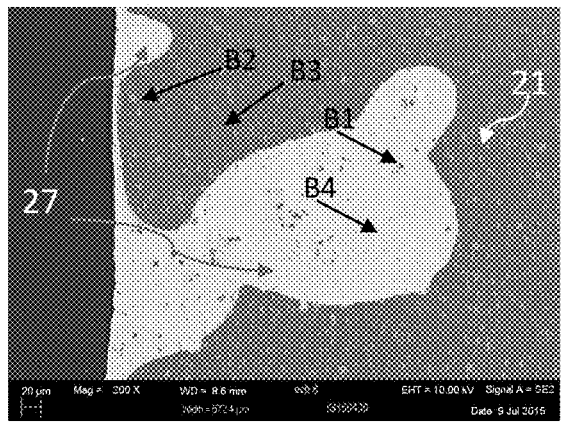
Figure 4C:
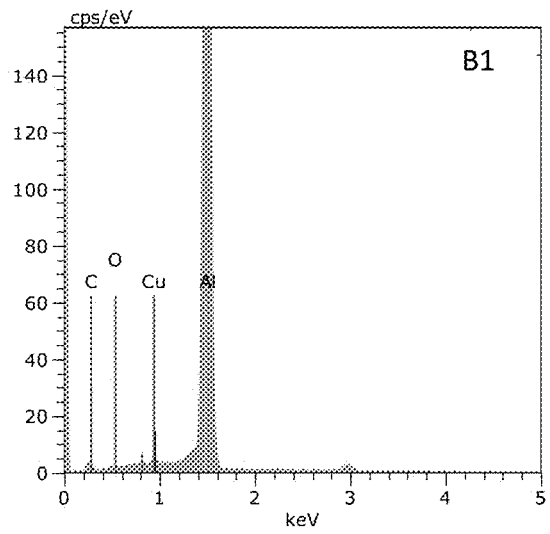
Figure 4D:
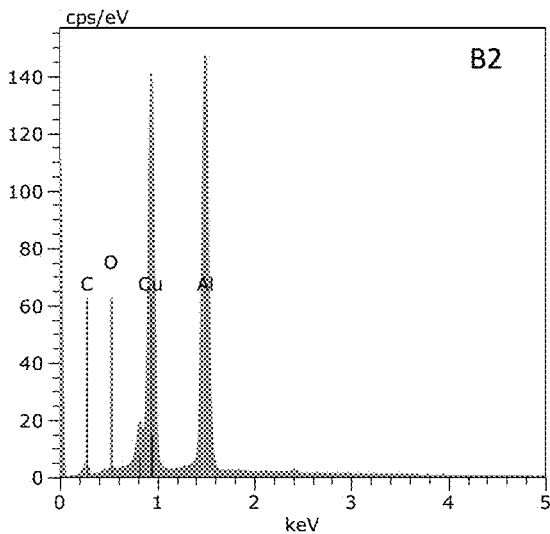
Figure 4E:
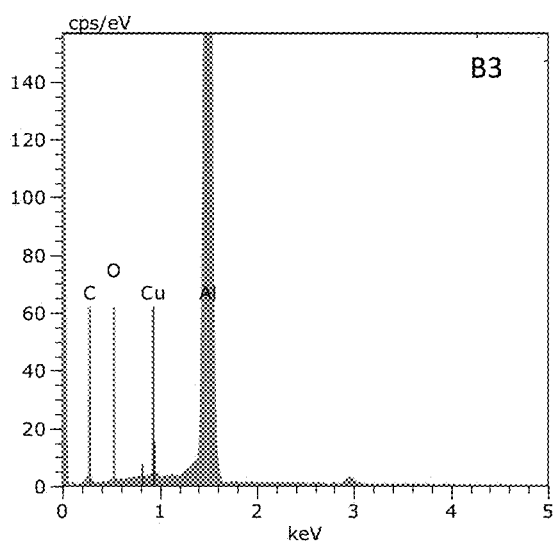
Figure 4F:
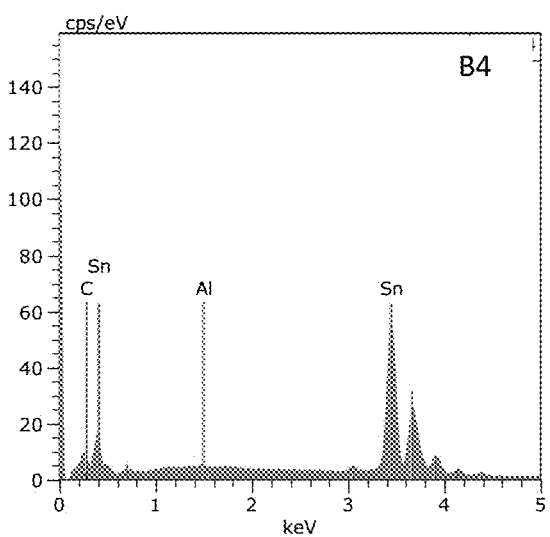

FIG. 4A shows a scanning electron microscope observation using a lengthwise field-effect X-ray source of a wire which has been treated in a similar way to the wire described in connection with FIGS. 3A to 3F, increasing the power of the ultrasonic wave 11 applied. A layer of tin coating 25 deposited around the substrate 21 can be seen, the thickness of the layer being of the order of 10 μm. It can also be seen that the coating layer 25 penetrates locally inside the substrate, in cavities 27 that may be more than 100 microns or 200 microns deep. In this way, the liquid metal 22 penetrates locally into the substrate 21, the cavities 27 forming open pores. FIG. 4A delimits a region of interest B corresponding to a cavity 27 and forming the subject of FIG. 4B. In this region of interest, four analysis points were identified, on which an X-ray fluorescence spectrometric analysis had been performed. FIGS. 4C, 4D, 4E and 4F are spectra corresponding to analysis points B1, B2, B3 and B4 respectively plotted in FIG. 4B. Point B1 (FIG. 4C) corresponds to a local aluminum residue. This residue is embedded in a cavity 27 200 microns deep, the cavity having been filled with tin. Point B2 (FIG. 4D) represents an inclusion of copper in the substrate. Point B3 (FIG. 4E) corresponds to the substrate material, in this case the aluminum alloy. As for point B4 (FIG. 4F), it represents the material in the cavity 27, in this case tin.

Figure 5A:
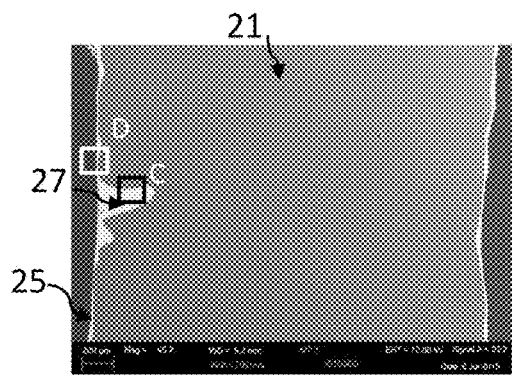
Figure 5B:
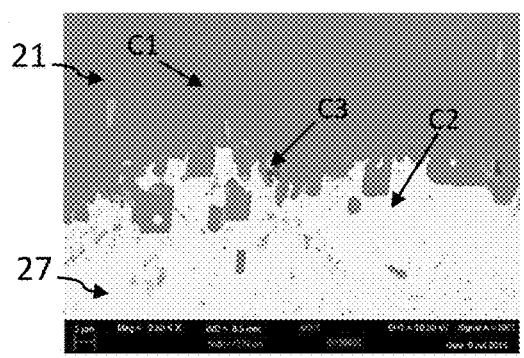
Figure 5C:
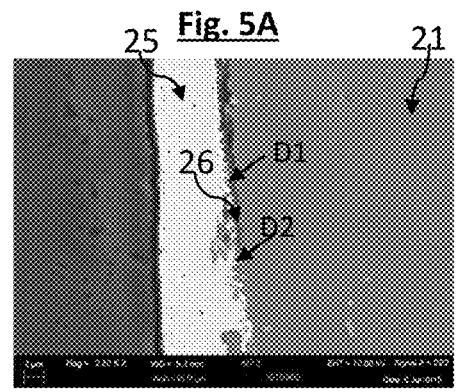
Figure 5D:
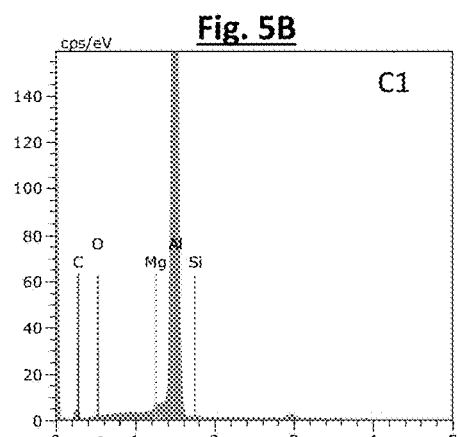
Figure 5E:
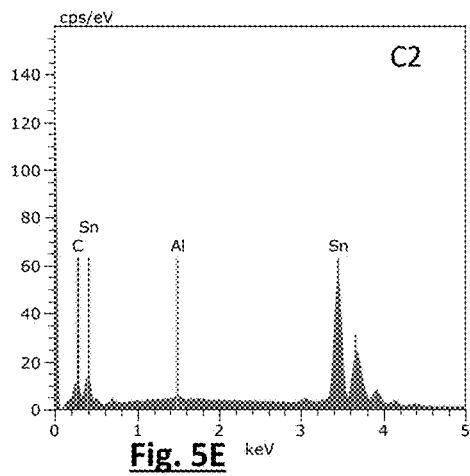
Figure 5F:
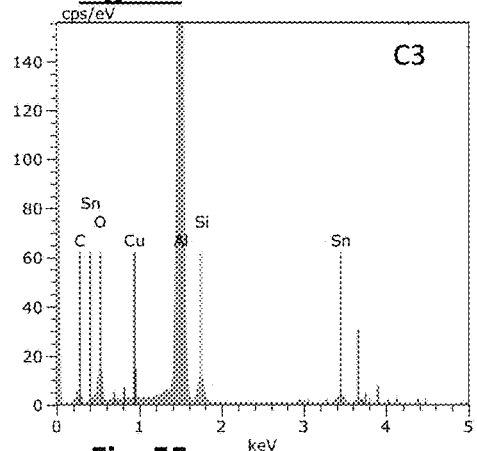

FIG. 5A shows a scanning electron microscope observation using a lengthwise field-effect X-ray source of a substrate 21 in the form of a 2.5 mm thick aluminum sheet, having been treated in a similar way to the wire described in connection with FIGS. 4A to 4F. A layer of tin coating 25 forming on either side of the substrate 21 can be observed. A cavity 27 is also visible. In FIG. 5A, two regions of interest C and D have been marked, these being the subject of FIGS. 5B and 5C. The region of interest C corresponds to a cavity 27, extending at a depth of about 250 μm from the surface of the sheet. FIGS. 5A, 5B and 5C are X-ray fluorescence spectra corresponding to analysis points C1, C2, and C3 plotted in FIG. 5B. Point C1 (FIG. 5D) corresponds to the substrate material 21, in this case the aluminum alloy. Point C2 (FIG. 5E) represents the material filling the cavity 27, in this case tin. Point C3 (FIG. 5F) corresponds to the interface between the substrate 21 and the cavity 27, with a predominance of aluminum and traces of tin. In cavity 27, therefore, the tin wets the aluminum directly.

Figure 5G:
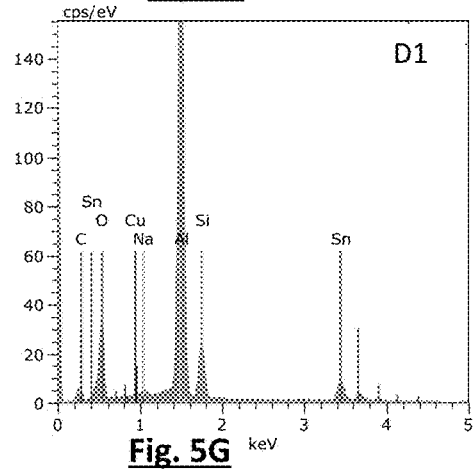
Figure 5H:
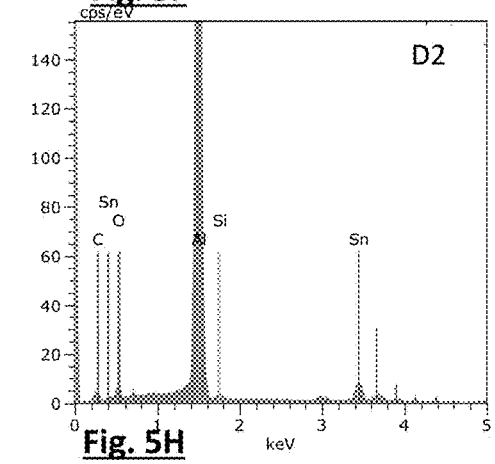

FIGS. 5G, 5H and are X-ray fluorescence spectra corresponding to analysis points D1 and D2, plotted in FIG. 5B. These analysis points are located at the interface between the substrate 21 and the tin coating layer 25. At point D1 (FIG. 5G), a residual trace of aluminum oxide (a high-amplitude oxygen peak) is observed, whereas at point D2 (FIG. 5H), the spectrum is representative of aluminum alloy. At this point, the oxide layer has been removed, which allows the substrate to be wetted directly by the tin.

Experimental tests show that the coating layer 25 is formed after partial or total destruction of the oxide layer 26 by the cavitation bubbles. When the power increases (or the frequency decreases) cavities 27 are formed on the surface of the substrate; they are more than 50 μm deep and may be more than 200 μm deep. Such cavities may cause deterioration of the surface condition of the substrate 21.

In the previous examples, the substrate 21 is metallic and is made of a metal. Tests have been successfully performed on substrates made of a first non-metallic material. The table below summarizes the different configurations tested.

TABLE 1

| Configurations tested for the first application | |
|---|---|
| First material (substrate) | Liquid metal |
| Aluminum | Tin |
| SiAlON ceramic | Tin |
| Titanium | Tin |
| SiAlON ceramic | Tin |
| Steel | Aluminum |
| SiAlON ceramic | Aluminum |
| Alumina | Aluminum |
| Steel | Aluminum |
| Titanium | Aluminum |
| Graphite | Aluminum |

The SiAlON ceramic referenced in Table 1 is a ceramic known to those skilled in the art, and designated by the term silicon aluminum oxynitride.

When the liquid metal is aluminum, it may advantageously contain magnesium, in a concentration of 20 ppm, or in a mass fraction greater than 0.05% or even greater than 0.5% or 0.7%, but generally less than 1%. This decreases the cavitation threshold of the liquid aluminum. One targeted application is for aluminizing a metal, for example steel.

Figure 6A:
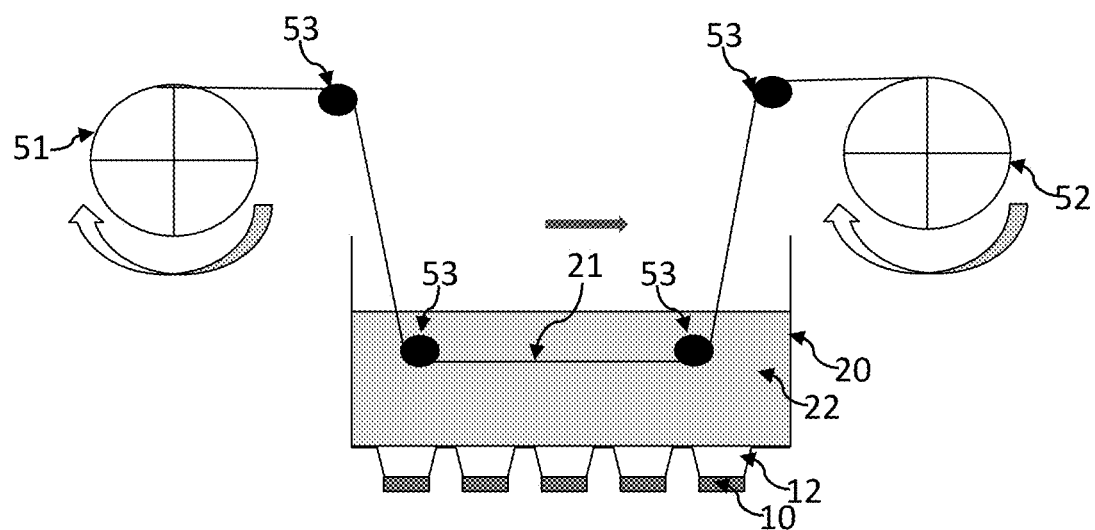
FIGS. 6A and 6B are examples of use of the invention according to a first application, in order to form a metal deposit on a substrate.
Figure 6B:
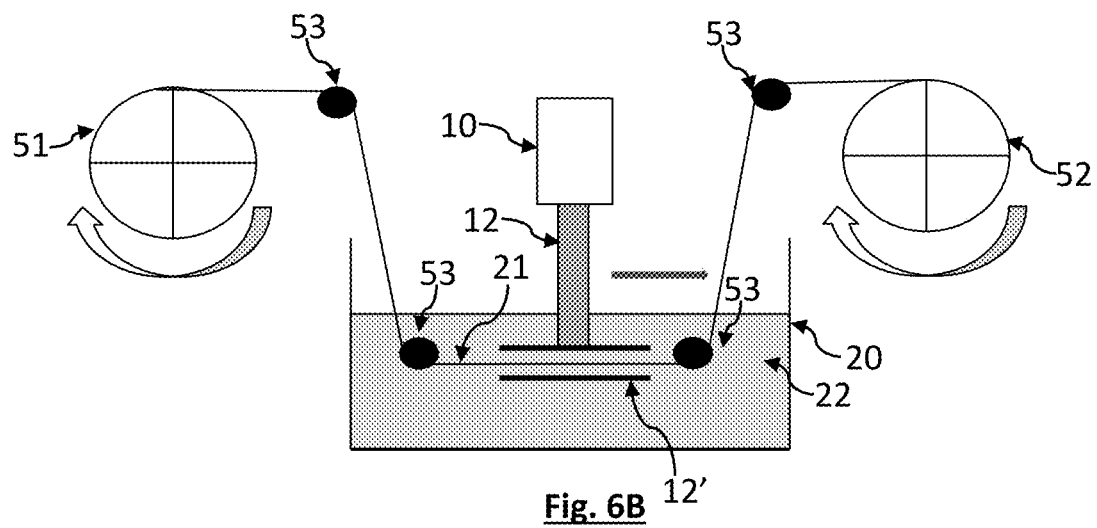

The method, tested in the experimental tests previously described, can be used industrially, for example using devices like those shown in FIGS. 6A and 6B. FIG. 6A shows a device comprising an unwinding reel 51 and a winding reel 52. A wire 21 unwinds from the unwinding reel 51 and is wound up in the winding reel 52, after passing through a bath comprising a liquid metal 22 in an enclosure 20. The movement of the wire is represented by a horizontal arrow. Freewheels 53 are used to adjust the trajectory of the wire. The bath of liquid metal 22 is subjected to an ultrasonic acoustic wave 11 produced by generators 10 aligned under the bottom of the enclosure 20, a waveguide 12 extending between each generator 10 and the bottom of the enclosure. The travel time of a section of wire in the bath is adjusted according to the drive speed, and may be at least 1 second, preferably between 1 second and 1 minute and even more preferably between 10 seconds and 1 minute. During exposure to the ultrasonic wave 11, the liquid metal is deposited around the wire in the form of a coating layer 25. When the wire is withdrawn from the liquid bath, the coating layer 25 solidifies and forms a deposit. FIG. 6B shows a variant of FIG. 6A. The ultrasonic wave is generated by a generator 10 coupled to a waveguide 12, the latter dipping into the liquid metal 22. The acoustic wave 11 is propagated by an auxiliary waveguide 12' of tubular shape, able to deform to propagate the acoustic wave 12' in the liquid metal 22.

The formation of a coating layer 25 on the surface of a solid substrate 21 may have the following applications:
  anti-corrosion protection;
  formation of a conductive layer;
  aiding welding, by local melting of the coating layer at a tack weld.

According to one variant, a substrate may successively undergo two successive baths, the first bath to form a first thin coating layer, the second bath to increase the thickness of the coating layer.

According to a second application, the invention can be used to increase the wettability of a solid substrate 21 placed at the interface between a ultrasonic generator control device 30 and a liquid metal 22. The solid substrate 21 is then either a part of a wall 20p of the enclosure 20 containing the liquid metal 22 (FIG. 7A), or a portion of a containment system 35 confining the ultrasonic control device 30, the containment system 35 being immersed in the liquid metal 22 (FIG. 7C). The increased wettability of the liquid metal 22 is used not to form a coating layer on a substrate, as previously described, but to improve the transmission properties of a control ultrasonic wave 31, the latter being intended for non-destructive testing in the enclosure.

Figure 7A:
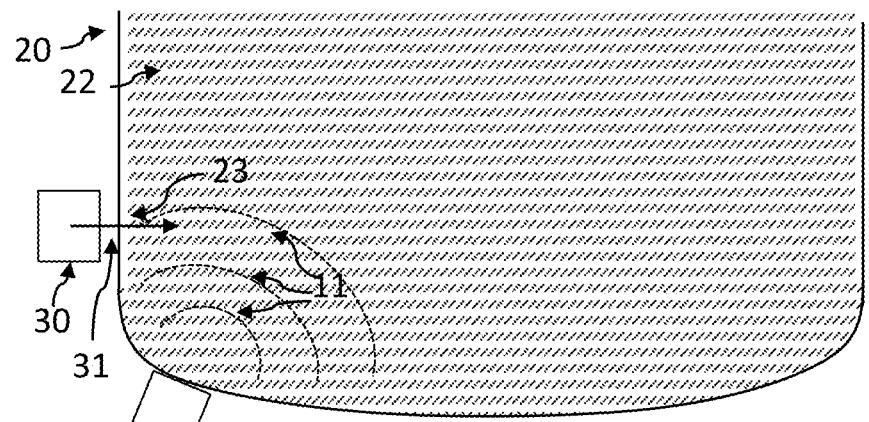
FIGS. 7A and 7C show schematically two examples of use of the invention according to a second application relating to non-destructive testing of a nuclear reactor vessel.

FIG. 7A shows a fast neutron reactor vessel 20, the coolant of which is formed by a liquid metal 22, in particular liquid sodium or liquid lead. Unlike water, which is used in pressurized water reactors, liquid sodium is optically opaque. The use of acoustic waves is therefore useful for continuous monitoring of operations or during maintenance operations. There are many applications: "visualization" in an opaque medium, distance measurement, surface metrology, detection of defects or cracks. A notable restriction is the high temperature to which the coolant is brought to maintain it in a liquid state, the temperature typically varying between 200° C. for maintenance operations and 550° C. when the reactor is in operation. An ultrasonic control device 30 is used, so as to emit an ultrasonic control wave 31, and may also act as a detector, so as to measure the time between the emission of an ultrasonic control wave and the detection of a reflected ultrasonic wave. The ultrasonic control wave 31 propagates at a surface power density less than the power density of the power ultrasonic wave 11, for example 10 times lower. The frequency of the ultrasonic control wave 31 is greater than the frequency of the ultrasonic power wave 11. Its frequency is typically between 1 MHz and 100 MHz. The power density of the ultrasonic control wave in the liquid metal is below the cavitation threshold.

Figure 7B:
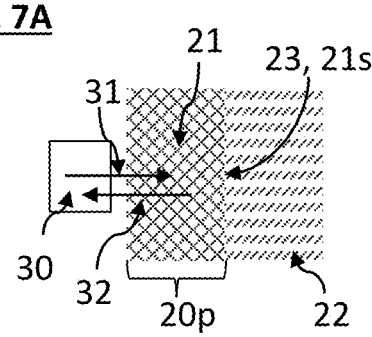
FIGS. 7B and 7D are details from FIGS. 7A and 7C respectively.
Figure 7C:
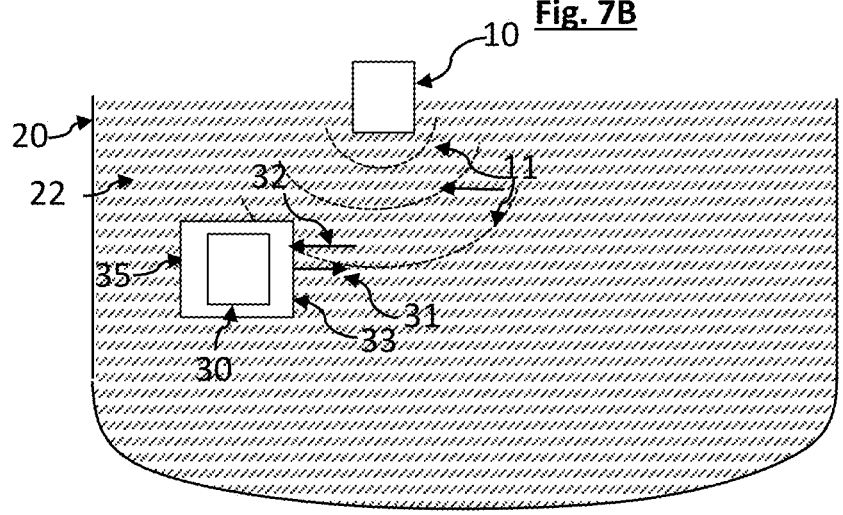

The ultrasonic control device 30 may be arranged against the vessel, outside the latter, so as to propagate the ultrasonic control wave 31 through a wall 20p of the vessel. The vessel then forms an enclosure 20, through which the ultrasonic wave 31 propagates between the ultrasonic control device 30 and the liquid metal 22. The surface of the enclosure, in contact with the liquid metal, and through which the ultrasonic wave 31 propagates, forms a so-called coupling surface 23. In order to optimize transmission of the control ultrasonic wave 31 through the coupling surface 23, the wettability of the liquid metal 22 on the coupling surface can be improved by exposing the coupling surface 23 to the ultrasonic power wave 11, as previously described. This facilitates transmission of the ultrasonic control wave 31 through the wall of the vessel 20p. The coupling surface 23 is therefore exposed to a power ultrasonic wave 11, emitted by a power ultrasound generator 10. As can be seen in FIG. 7B, the coupling surface 23 delimits a solid substrate 21 consisting of the metal forming the wall 20p of the vessel 20 in the vicinity of the coupling surface. The application of the power ultrasonic wave 11 increases the wettability of the surface of the substrate 21 by the liquid metal 22, and promotes transmission of the ultrasonic control wave 31 through the coupling surface 23. It may also promote transmission of a reflected ultrasonic wave 32 propagating from the vessel to the ultrasonic control device 30, through the coupling surface.

The power generator 10 is arranged such that the ultrasonic power wave 11, at the coupling surface 23, has a power density greater than the cavitation threshold of the liquid metal 22. The frequency of the ultrasonic power wave 11 is preferably between 10 kHz and 250 kHz. In order to avoid the formation of cavities in the vessel, under the effect of cavitation bubbles, the frequency of the power ultrasonic wave 11 is advantageously greater than 40 kHz, and typically between 40 kHz and 80 KHz. The power generator 10 may be arranged outside the vessel 20 or inside the vessel. Preferably, the ultrasonic power wave 11 propagates within the liquid metal 22 at a propagation distance greater than 1 cm and preferably greater than 5 cm, before reaching the coupling surface 23. The latter forms a surface 21s of the substrate. This avoids exposing the coupling surface 23 to an excessively high density of cavitation bubbles, as described in connection with the first application.

Figure 7D:
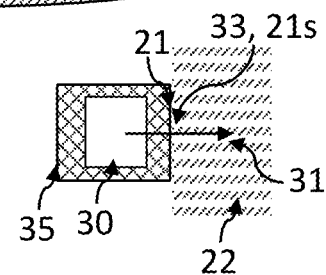

According to a variant, shown in FIG. 7C, the ultrasonic control device 30 is immersed in the vessel 20 and is confined in a containment system 35, formed from a containment metal. As can be seen in FIG. 7D, the containment system 35 then defines a coupling surface 33, extending in contact with the liquid metal, through which the control wave 31 propagates from the ultrasonic control device 30 to the liquid metal 22. The coupling surface 33 delimits a solid substrate 21 made of the metal forming the containment system 35. The application of the ultrasonic power wave 11 increases the wettability of the liquid metal 22 on the metal of the containment system 35 and promotes transmission of the ultrasonic control wave 31 through the coupling surface 33. It may also promote transmission of a reflected ultrasonic wave 32 propagating from the vessel to the ultrasonic control device 30. The power generator 10 is arranged such that the ultrasonic power wave 11, at the coupling surface 23, has a power density greater than the cavitation threshold of the liquid metal. The frequency of the ultrasonic power wave 11 is preferably between 10 kHz and 250 kHz. A frequency lower than 40 KHz, for example 20 kHz, may cause the formation of cavities in the containment system 35 at the level of the coupling surface 33. This is not critical, since the containment system 35 can be replaced.

The configurations shown in table 2 can be implemented as part of this application.

TABLE 2 examples of configurations related to the second embodiment

| First material (substrate) | Liquid metal |
|---|---|
| Titanium | Sodium |
| Steel | Sodium |
| Stainless steel | Sodium |
| Ceramic | Sodium |

The ceramic may be a ceramic based on silicon, aluminum, nitrogen or oxygen, for example silicon aluminum oxynitrides (SiAlON), silicon nitride (Si3N4) or ruby.

The invention claimed is:

1. A method of treating a solid substrate comprising the steps of:
   a) bringing the solid substrate into contact with a liquid metal confined inside an enclosure;
   b) propagating an ultrasonic power wave, emitted by a power ultrasound generating device, in the liquid metal, the ultrasonic power wave propagating though the liquid metal before reaching the surface of the solid substrate, in such a way that at said surface of the substrate, a power density of the ultrasonic power wave is greater than a cavitation threshold of the liquid metal, the frequency of the ultrasonic power wave being between 10 kHz and 250 kHz;
   c) following the propagation of the ultrasonic power wave, obtaining cavitation bubbles in the liquid metal, the cavitation bubbles reaching the surface of the solid substrate, the interaction of the cavitation bubbles with the surface of the solid substrate increasing the wettability of the latter by the liquid metal;
   wherein the ultrasonic power wave propagates from the power generator and passes through an interface surface extending into contact with the liquid metal, the method comprising the formation of cavitation bubbles inside a hyper-cavitation cone, in which the density of the cavitation bubbles is higher than outside the hyper-cavitation cone, the hyper-cavitation cone extending within the liquid metal from the interface surface, wherein, in step c), the solid substrate is arranged outside the hyper-cavitation cone.

2. The method according to claim 1, wherein the frequency of the ultrasonic power wave is greater than 40 kHz.

3. The method according to claim 1, in which during step b), the ultrasonic power wave propagates, inside the enclosure, within the liquid metal, at a propagation distance greater than 1 cm.

4. The method according to claim 3, wherein the propagation distance is greater than 5 cm.

5. The method according to claim 1, wherein the interface surface is a solid wall through which the ultrasonic power wave propagates.

6. The method according to claim 1, wherein the solid substrate is a metal or ceramic substrate, and wherein the method further comprises the steps of:
   d) exposing the substrate to the ultrasonic power wave, the liquid metal forming a coating layer on the substrate;
   e) removing the substrate from the enclosure; and
   f) after removing the substrate, solidifying the liquid metal to form a deposit on the substrate.

7. The method according to claim 6, wherein the substrate is metallic, and wherein a metal in the substrate has a melting temperature greater than that of the liquid metal.

8. The method according to claim 6, wherein the liquid metal is an electrically conductive metal, such that the deposit formed in step f) is an electrically conductive deposit.

9. The method according to claim 8, wherein the liquid metal comprises tin, zinc, or lead.

10. The method according to claim 6, wherein a thickness of the deposit formed in step f) is between 5 μm and 2 mm.

11. The method according to claim 6, wherein, in step d), the substrate is exposed to the ultrasonic power wave for a period of time between 1 second and 1 minute.

12. The method according to claim 1, wherein the liquid metal comprises aluminum.

13. The method according to claim 12, wherein the liquid metal comprises magnesium in a mass fraction of less than 1%.

14. The method according to claim 13, wherein the enclosure is a nuclear reactor vessel, and wherein the liquid metal comprises sodium or lead.

15. A method of treating a solid substrate comprising the steps of:
   a) bringing the solid substrate into contact with a liquid metal confined inside an enclosure;
   b) propagating an ultrasonic power wave, emitted by a power ultrasound generating device, in the liquid metal, the ultrasonic power wave propagating though the liquid metal before reaching the surface of the solid substrate, in such a way that at said surface of the substrate, a power density of the ultrasonic power wave is greater than a cavitation threshold of the liquid metal, the frequency of the ultrasonic power wave being between 10 kHz and 250 kHz;
   c) following the propagation of the ultrasonic power wave, obtaining cavitation bubbles in the liquid metal, the cavitation bubbles reaching the surface of the solid substrate, the interaction of the cavitation bubbles with the surface of the solid substrate increasing the wettability of the latter by the liquid metal;
   wherein an ultrasonic control device propagates an ultrasonic control wave, within the liquid metal, through a surface known as a coupling surface, the coupling surface being a surface of the solid substrate extending into contact with the liquid metal;
   wherein the solid substrate is delimited by the coupling surface; and
   wherein, during step c), the wettability of the surface of the solid substrate by the liquid metal is increased so as to improve transmission of the ultrasonic control wave within the liquid metal, through the coupling surface.

16. The method according to claim 15, wherein the ultrasonic control device is placed outside the enclosure, the coupling surface then corresponding to an interface between the enclosure and the liquid metal through which the ultrasonic control wave propagates, the solid substrate being formed by a part of the enclosure delimited by the coupling surface.

17. The method according to claim 15, wherein the ultrasonic control device is confined within a containment system, the containment system being immersed in the liquid metal, the coupling surface corresponding to an interface of the containment system with the liquid metal, through which the ultrasonic control wave propagates, the solid substrate being formed by a portion of the containment system delimited by the coupling surface.

18. The method according to claim 15, wherein the frequency of the ultrasonic power wave is greater than 40 kHz.

19. The method according to claim 15, in which during step b), the ultrasonic power wave propagates, inside the enclosure, within the liquid metal, at a propagation distance greater than 1 cm.

20. The method according to claim 15, wherein the interface surface is a solid wall through which the ultrasonic power wave propagates.

\* \* \* \* \*